(12) United States Patent
Park

(10) Patent No.: US 11,251,594 B2
(45) Date of Patent: Feb. 15, 2022

(54) FASTENING STRUCTURE OF CLAMP FOR SUPPORTING POWER LINE AND INSULATOR

(71) Applicant: Cheol Woong Park, Ansan-si (KR)

(72) Inventor: Cheol Woong Park, Ansan-si (KR)

( * ) Notice: Subject to any disclaimer, the term of this patent is extended or adjusted under 35 U.S.C. 154(b) by 915 days.

(21) Appl. No.: 16/063,267

(22) PCT Filed: Dec. 7, 2016

(86) PCT No.: PCT/KR2016/014291
§ 371 (c)(1),
(2) Date: Jun. 16, 2018

(87) PCT Pub. No.: WO2017/105027
PCT Pub. Date: Jun. 22, 2017

(65) Prior Publication Data
US 2018/0375315 A1    Dec. 27, 2018

(30) Foreign Application Priority Data

Dec. 16, 2015 (KR) .......................... 10-2015-0179787

(51) Int. Cl.
*H02G 7/05* (2006.01)

(52) U.S. Cl.
CPC ............. *H02G 7/053* (2013.01); *H02G 7/056* (2013.01)

(58) Field of Classification Search
CPC ................................ H01B 7/053; H01B 7/056
See application file for complete search history.

(56) References Cited

U.S. PATENT DOCUMENTS

| | | | | |
|---|---|---|---|---|
| 1,898,071 A | * | 2/1933 | Wildin | F16B 21/12 411/514 |
| 2,291,847 A | * | 8/1942 | Taylor | H01B 17/08 411/530 |
| 3,274,879 A | * | 9/1966 | Poller | F16B 21/086 411/351 |
| 3,742,807 A | * | 7/1973 | Manning | F16B 21/086 269/48.2 |
| 5,539,961 A | * | 7/1996 | DeFrance | H02G 7/056 24/136 R |
| 2007/0107929 A1 | * | 5/2007 | Park | H01B 17/06 174/138 D |
| 2012/0225408 A1 | * | 9/2012 | Moore | F16B 19/1081 433/174 |

* cited by examiner

*Primary Examiner* — Steven T Sawyer
*Assistant Examiner* — Paresh H Paghadal
(74) *Attorney, Agent, or Firm* — Korus Patent, LLC; Seong Ii Jeong

(57) ABSTRACT

Provided is a fastening structure of a clamp for supporting a power line and an insulator, which includes a fastening means for preventing an end of the insulator from being separated from the clamp in a state in which the end of the insulator is disposed between an arm part and an auxiliary arm part of the clamp. The fastening means includes a pin fitted to pass through through-holes of the arm part and the auxiliary arm part of the clamp and the end of the insulator and an elastic latching rod mounted on the pin and elastically curved to pass through each of the through-holes and to be restored in its original shape, thereby preventing the pin from being separated. The elastic latching rod is mounted on the pin and has the form of a coil spring where both ends of the elastic latching rod protrude from the pin.

1 Claim, 6 Drawing Sheets

FASTENING STRUCTURE OF CLAMP FOR SUPPORTING POWER LINE AND INSULATOR

TECHNICAL FIELD

The present invention relates to a fastening structure of a clamp used for supporting a power line and an insulator in a telegraph pole.

BACKGROUND ART

Generally, power lines are installed in various forms on the ground and through the underground from the power plant to each of customers. A method using a telegraph pole is being used as an installation method on the ground section.

According to the method for supporting the power lines by using the telegraph pole, telegraph poles are installed at a predetermined interval, and the power lines are supported by the telegraph poles to stably maintain the installation state of the power lines.

The telegraph pole and the power line are connected to each other through an insulation structure so that current does not flow to the telegraph pole. Such an insulation structure is installed in a manner in which an insulator 8 is disposed between a transverse support 4 mounted on the telegraph pole 2 and a power line 6 as illustrated in FIG. 1.

That is, the power line 6 is supported by the pair of insulators 8 disposed at opposite sides of the transverse support 4, respectively, so that the current of the power line 6 does not flow to the telegraph pole 2. The power line 6 is fixed and supported by a clamp 10 connected with the insulator 8.

As illustrated in FIG. 2, the clamp 10 has a wedge shape having a width that gradually decreases forward and includes a housing 101 defining a space therein, a pair of jaws 102 slidably mounted within the housing 101, a support plate (not shown) mounted on the housing (101) so as to be interlocked with the jaws 102, and a compression coil spring (not shown) installed on the jaws 102 and pressed by the support plate.

An arm part 103 to be connected with the insulator 8 is disposed at a rear side of the housing 101.

An auxiliary arm part 104 having a bent shape so that an end thereof is parallel to the arm part 103 at a predetermined interval is disposed on an end of a rear portion of the arm part 103, and through-holes are formed in the arm part 103 and the auxiliary arm part 104 at positions that are aligned with each other.

Also, in a state in which an end of the insulator 8 is disposed between the arm part 103 and the auxiliary arm part 104, the end of the insulator 8 is fastened by the fastening means so that the end of the insulator 8 is not separated from the clamp 10.

The fastening means includes a pin 12 fitted to pass through the arm part 103, the auxiliary arm part 104, and the end of the insulator 8, and a latching pin 121 fittably coupled to an end of the pin 12 to prevent the pin 12 from being separated.

According to the conventional technology, strong tensile stress transmitted from the insulator 8 to the clamp 10 through the pin 12 is dispersed into the arm part 103 and the auxiliary arm part 104 to maintain the relatively stable fastened state (see Korean Patent Application No. 10-2004-0060764).

In case of replacing the aged or broken clamp 10 or insulator 8, the pin 12 has to be separated from the clamp 10 and the insulator 8, and then coupled again. Here, the latching pin 121 has to be separated from the pin 12 before the pin 12 is separated, and also, the latching pin 121 has to be fitted into the pin 12 after the pin 12 is coupled.

Also, since such the work is performed at an upper position of the telegraph pole, in order to improve stability of the work, it is necessary to quickly perform the process of separating and fastening the clamp 10 from/to the insulator 8.

However, since the worker wears thick insulating gloves to prevent an elastic shock accident from occurring during the work, the work may be delayed because it is not easy to accurately separate or fit the latching pin 121 from/into the pin 12.

Also, since the latching pin 121 has a small size, the latching pin 121 may be lost during the work causing a serious problem to the work.

DETAILED DESCRIPTION OF THE INVENTION

Technical Problem

The present invention has been made to solve the above problems, and an object of the present invention is to provide a fastening structure of a clamp for supporting a power line and an insulator, in which the clamp and the insulator are quickly and stably fastened and separated to improve efficiency of a work for maintaining and repairing the power line.

Technical Solution

To achieve the abovementioned object, a fastening structure of a clamp for supporting a power line and an insulator according to the present invention includes a fastening means for preventing an end of the insulator from being separated from the clamp in a state in which the end of the insulator is disposed between an arm part and an auxiliary arm part of the clamp.

The fastening means may include: a pin fitted to pass through through-holes of the arm part and the auxiliary arm part of the clamp and the end of the insulator; and an elastic latching rod mounted on the pin and configured to be elastically bent to pass through each of the through-holes and to be restored in its original shape, thereby preventing the pin from being separated.

The elastic latching rod may be mounted on the pin and have the form of a coil spring where both ends of the elastic latching rod protrude from the pin.

A dent groove corresponding to each of both the protruding ends of the elastic latching rod may be formed in each of side surfaces of the pin facing each other.

The elastic latching rod may be mounted on the pin in a manner in which the elastic latching rod is fittably coupled to a fitting hole formed in a lower end of the pin.

Advantageous Effects

As described above, according to the fastening structure of the clamp for supporting the power line and the insulator, the clamp and the insulator may be safely and quickly fastened and separated by using the pin provided with the elastic latching rod to improve the efficiency and stability of the work due to the maintenance and repair of the power line.

BEST MODE

Hereinafter, exemplary embodiments of the present invention will be described in detail with reference to the accompanying drawings.

First, a fastening structure of a clamp for supporting a power line and an insulator according to the present invention includes a fastening means for preventing an end of the insulator 8 from being separated from the clamp 10 in a state in which the end of the insulator 8 is disposed between an arm part 103 and an auxiliary arm part 104 of the clamp 10.

Figure 1:
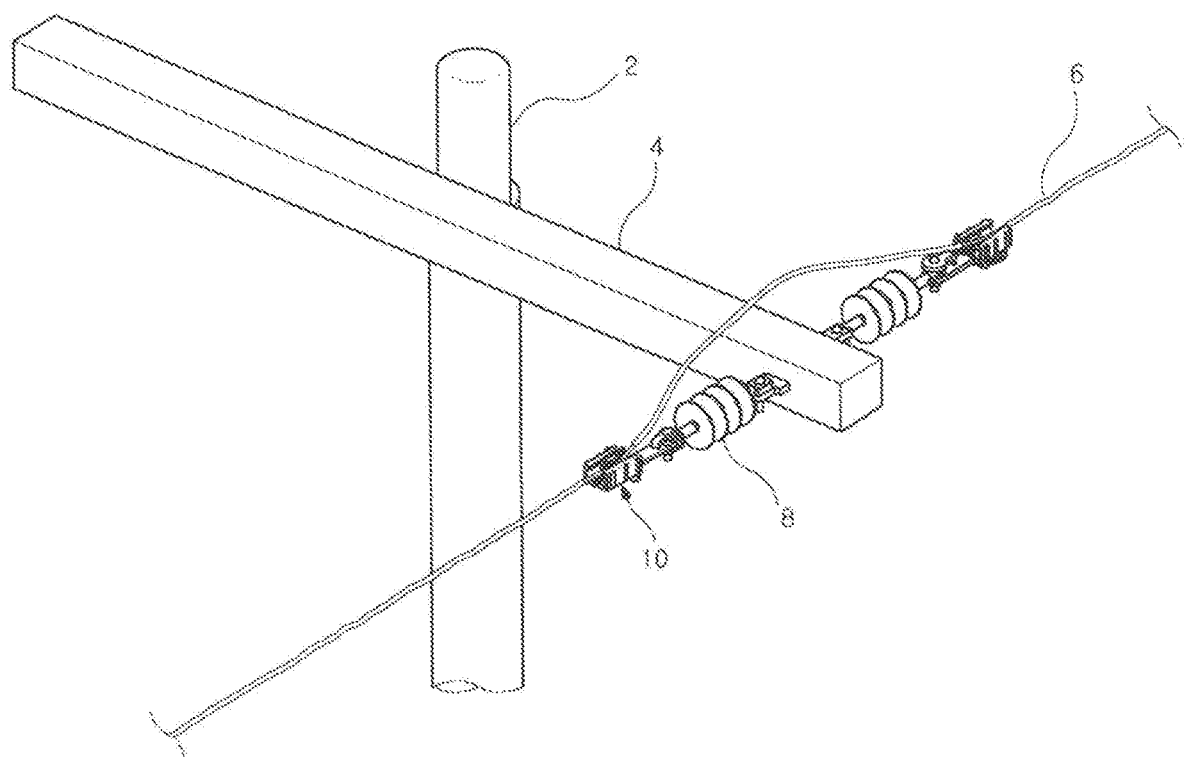
FIG. 1 is a view illustrating a general fastening structure of a clamp for supporting a power line and an insulator.
Figure 2:
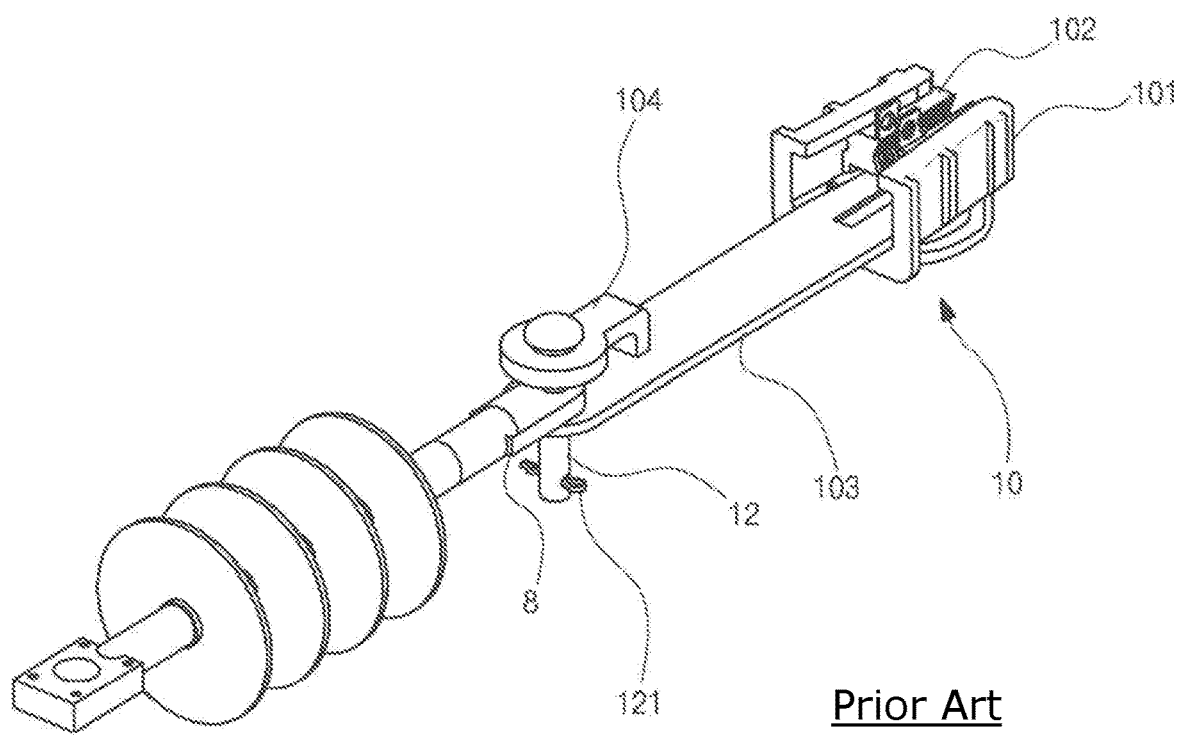
FIG. 2 is a perspective view illustrating the fastening structure of the clamp for supporting the power line and the insulator according to conventional technology.
Figure 3:
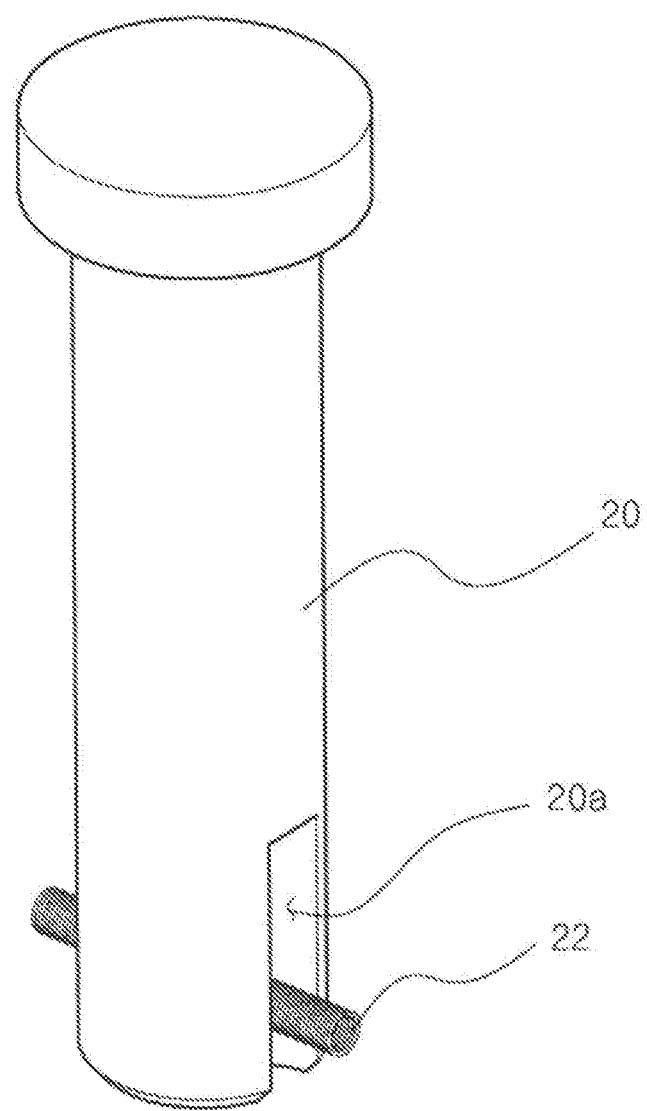
FIG. 3 is a perspective view illustrating a coupled state between a pin and an elastic latching rod according to the present invention.

As illustrated in FIG. 3, the fastening means includes a pin 20 fitted to pass through through-holes 10a, 10b, and 8a of the arm part 103, the auxiliary arm part 104 of the clamp 10, and the insulator 8, respectively, and an elastic latching rod 22 mounted on the pin 20.

The elastic latching rod 22 is mounted on the pin 20 and has the form of a coil spring having a length greater than a diameter of each of the through-holes 10a, 10b, and 8a as the form of a rod where both ends of the elastic latching rod 22 protrude from the pin 20.

The elastic latching rod 22 may have a shape in which gaps between spirals are dense to improve structural strength.

Also, a dent groove 20a is formed in each of side surfaces facing each other at a position corresponding to each of both the protruding ends of the elastic latching rod 22.

Also, the elastic latching rod 22 is mounted on the pin 20 in a manner in which the elastic latching rod 22 is fittably coupled to the fitting hole 20b formed in a lower end of the pin 20.

Figure 4:
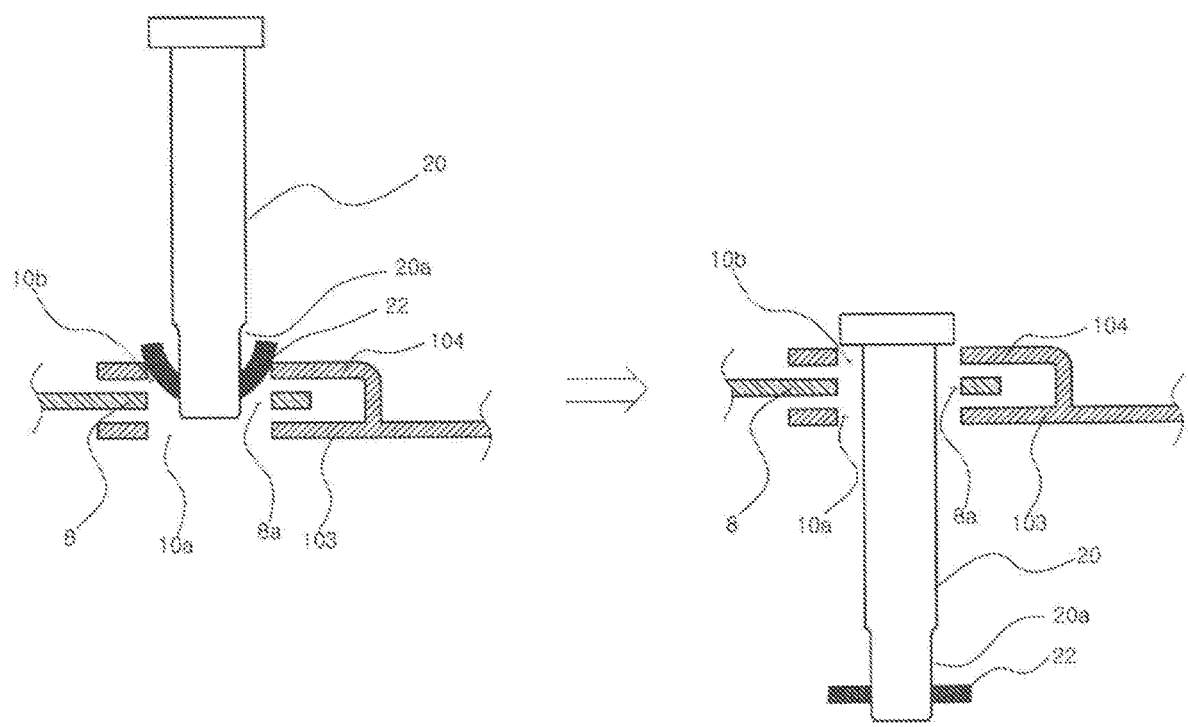
FIG. 4 is a view illustrating an example of a process of fitting the pin into a clamp and an insulator according to the present invention.

A function of the fastening structure of the clamp for supporting the power line and the insulator, which is configured as described above, according to the present invention will be described below. First, when the clamp 10 and the insulator are fastened, as illustrated in FIG. 4, an end of the insulator 8 is disposed between the arm part 103 and the auxiliary arm part 104 of the clamp 10 to push the pin 20 on which the elastic latching rod 22 is mounted so that the pin 20 passes through each of the through-holes 10a, 10b, and 8a in such a way that the through-holes 10a and 10b of the arm part 103 and the auxiliary arm part 104 and the through-hole 8a of the insulator 8 are aligned with each other.

Here, the elastic latching rod 22 is elastically bent upward so that the gaps between the both ends of the elastic latching rod 22 protruded from the pin 20 and the pin 20 are narrowed while passing through the through-holes 10a, 10b, and 8a.

After the elastic latching rod 22 passes through each of the through-holes 10a, 10b, and 8a, both the bent ends are elastically restored to be spread in its original shape.

Figure 5:
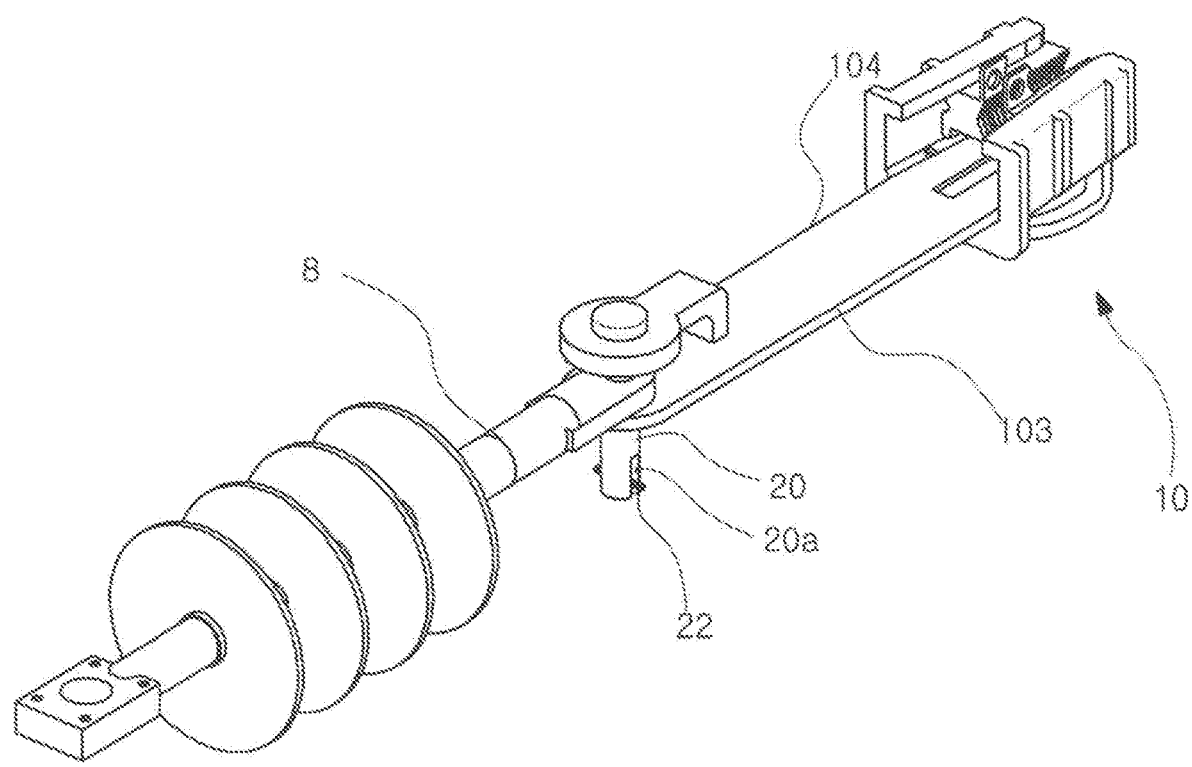
FIG. 5 is a view illustrating a state in which the clamp and the insulator are fastened by the pin according to the present invention.

Since the elastic latching rod 22 has the length greater than the diameter of the through-hole 10a as illustrated in FIG. 5 after the bent shape of the elastic latching rod 22 is restored, the elastic latching rod 22 is latched on the arm part 103 of the clamp 10 to prevent the pin 20 from being separated from its position without artificial manipulation.

Also, when the pin 20 inserted into the through-holes 10a, 10b, and 8a is withdrawn to release the fastened state between the clamp 10 and the insulator 8, the worker may grip the pin 20 and pull the pin 20 in the withdrawal direction to withdraw the pin 20 through the process in which the elastic latching rod 22 is elastically bent to pass through each of the through-holes 10a, 10b, and 8a.

That is, according to the present invention, the clamp 10 and the insulator 8 may be stably fastened through the simple manipulation. On the other hand, the clamp 10 and the insulator 8 may be easily separated from each other through the simple manipulation.

Figure 6:
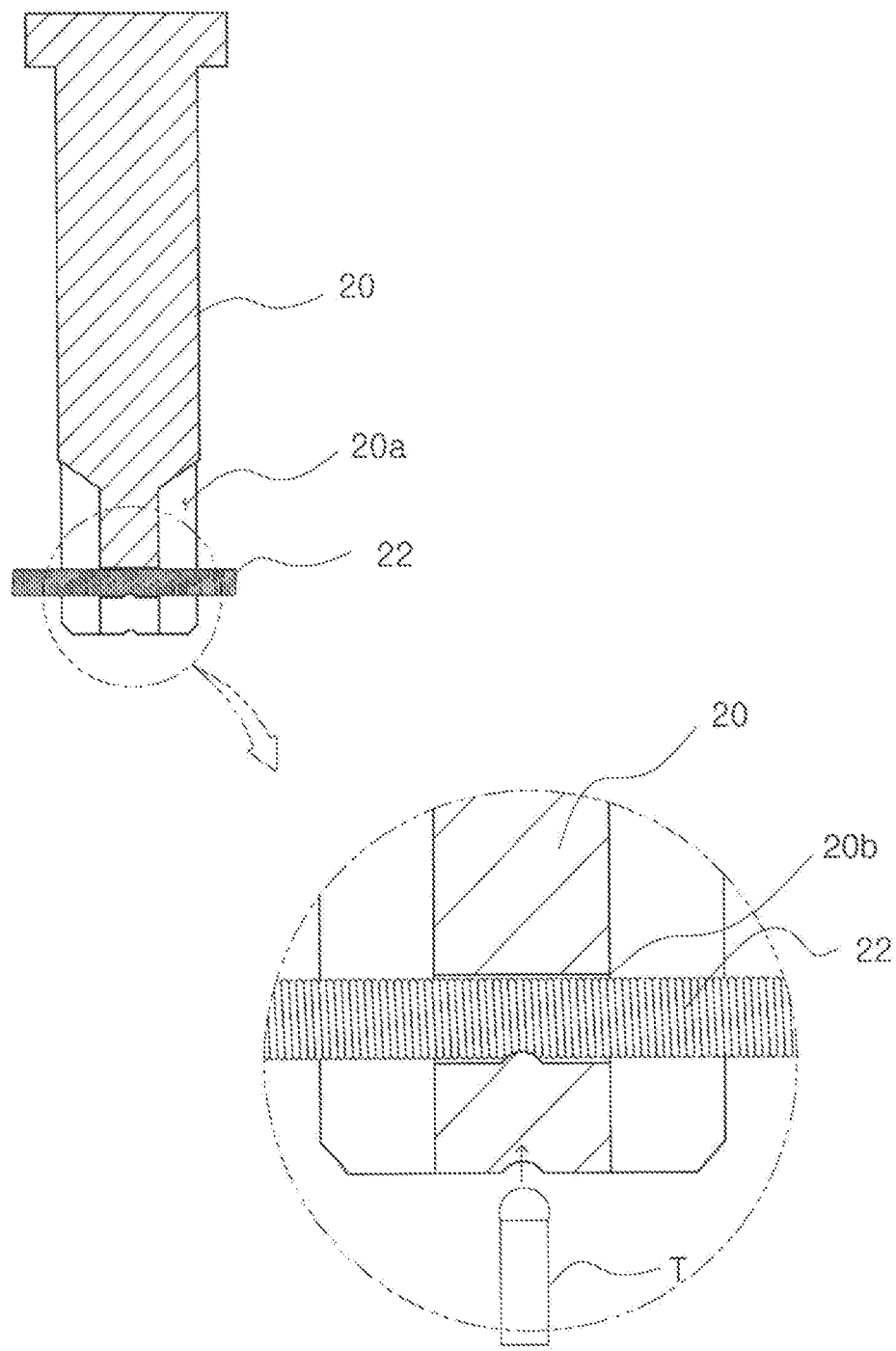
FIG. 6 is a view illustrating an example of a method for fixing the elastic latching rod to the pin according to the present invention.

Furthermore, as illustrated in FIG. 6, fixing of the elastic latching rod 22 is realized in a manner in which a tool T and the like may strike a bottom surface of the pin 20 to allow the inside of the fitting hole 20b to protrude and deform so that the elastic latching rod 22 is fitted into the fitting hole 20b through the physical pressure to the elastic latching rod 22 by the protrusion.

As described above, when fixing the elastic latching rod 22, material characteristics of the pin 20 made of a metal material are generally used. When compared to a method for fixing the elastic latching rod 22 to the pin 20 by using an adhesive or the like, the above-described fixing method may have features that a work speed is faster, and the fixed state is firmly maintained.

The fastening structure of the clamp for supporting the power line and the insulator may be applied to all components having a separable connection configuration used for supporting the power line as well as the above-described fasting structure between the clamp 10 and the insulator 8.

REFERENCE SIGNS LIST

8: insulator
10: clamp
103: arm part
104: auxiliary arm part
20: pin
20a: dent groove
20b: fitting hole
22: elastic latching rod

The invention claimed is:

1. A fastening structure of a clamp for supporting a power line and an insulator, the fastening structure comprising:
   a fastening means for preventing an end of the insulator from being separated from the clamp in a state in which the end of the insulator is disposed between an arm part and an auxiliary arm part of the clamp,
   wherein the fastening means comprises:

a pin fitted to pass through through-holes of the arm part and the auxiliary arm part of the clamp and the end of the insulator; and an elastic latching rod mounted on the pin and configured to be elastically bent to pass through each of the through-holes and to be restored in its original shape, thereby preventing the pin from being separated, wherein the elastic latching rod has a form of a coil spring, wherein the elastic latching rod is configured to be passed through and fittably coupled to a fitting hole formed in a lower end of the pin such that both ends of the elastic latching rod protrude from the pin when the elastic latching rod is passed through and coupled to the fitting hole, wherein grooves corresponding to both the protruding ends of the elastic latching rod are formed in opposite side surfaces of the pin to prevent the elastic latching rod from interfering with the side surfaces of the pin when the protruding ends of the elastic latching rod are bent, the grooves having a width and a length larger than a diameter and a length of the protruding ends of the elastic latching rod, respectively, and wherein, in a state in which the elastic latching rod is mounted into the fitting hole of the pin, a protrusion is formed inside of the fitting hole such that the elastic latching rod is fixed to the pin by the protrusion.

\* \* \* \* \*